United States Patent
Kim

(10) Patent No.: US 12,369,559 B2
(45) Date of Patent: Jul. 29, 2025

(54) PAD ROD FOR DEFECATION PAD AND DEFECATION PROCESSING DEVICE HAVING SAME FOR COMPANION ANIMAL

(71) Applicant: Jang Woon Kim, Gyeonggi-do (KR)

(72) Inventor: Jang Woon Kim, Gyeonggi-do (KR)

( * ) Notice: Subject to any disclaimer, the term of this patent is extended or adjusted under 35 U.S.C. 154(b) by 0 days.

(21) Appl. No.: 18/270,422

(22) PCT Filed: Aug. 2, 2022

(86) PCT No.: PCT/KR2022/011371
§ 371 (c)(1),
(2) Date: Jun. 29, 2023

(87) PCT Pub. No.: WO2023/018091
PCT Pub. Date: Feb. 16, 2023

(65) Prior Publication Data
US 2024/0057551 A1    Feb. 22, 2024

(30) Foreign Application Priority Data

Aug. 12, 2021 (KR) .................. 10-2021-0106950

(51) Int. Cl.
*A01K 1/01* (2006.01)
(52) U.S. Cl.
CPC .......... *A01K 1/0107* (2013.01); *A01K 1/0117* (2013.01)
(58) Field of Classification Search
CPC .. A01K 1/0107; A01K 1/0117; F16H 57/0025
See application file for complete search history.

(56) References Cited

U.S. PATENT DOCUMENTS

| 8,464,662 B1 * | 6/2013 | Shorenstein ......... A01K 1/0107 119/164 |
| 2022/0210998 A1 * | 7/2022 | Cook ................... A01K 1/0157 |

FOREIGN PATENT DOCUMENTS

| CN | 111520414 A | * | 8/2020 | ............... F16D 1/08 |
| CN | 115053814 A | * | 9/2022 | |
| JP | 2779217 B2 | * | 7/1998 | |
| JP | 2008195500 A | * | 8/2008 | |
| KR | 20-0337891 | | 12/2003 | |

(Continued)

OTHER PUBLICATIONS

Machine translation of JP 2779217 B2 obtained on Jan. 17, 2025.*
Machine translation of KR 10-2394870 B1 obtained on Jan. 22, 2025.*

*Primary Examiner* — Adam D Rogers
(74) *Attorney, Agent, or Firm* — IPLA P.A.

(57) ABSTRACT

A pad rod for a defecation pad, which has a simple structure and is easily used and post-processed, and a defecation processing device having same for a companion animal, wherein the pad rod includes: a first shaft which extends in a first direction and has a cross section perpendicular to the first direction, having a semicircular or partially semicircular edge; a second shaft which extends in the first direction and has a cross sectional perpendicular to the first direction, having a semicircular or partially semicircular edge; first fastening elements including magnets mounted at one of the first shaft and the second shaft; and second fastening members which are mounted to the other of the first shaft and the second shaft to correspond to the first fastening elements when the first shaft and the second shaft are coupled, and include ferromagnets or magnets.

12 Claims, 11 Drawing Sheets

(56) References Cited

FOREIGN PATENT DOCUMENTS

| | | |
|---|---|---|
| KR | 101931476 | 12/2018 |
| KR | 102049065 | 1/2020 |
| KR | 20200000206 | 1/2020 |
| KR | 20210051603 | 5/2021 |

* cited by examiner

PAD ROD FOR DEFECATION PAD AND DEFECATION PROCESSING DEVICE HAVING SAME FOR COMPANION ANIMAL

BACKGROUND

The present invention relates to a rod for a defecation pad and a defecation pad treating device having the same for a companion animal, more specifically to a rod for a defecation pad and a defecation pad treating device having the same for a companion animal that are capable of being simple in configuration and easy to be used and then treated after the use.

Recently, it is common to keep companion animals such as dogs, cats, and the like at home. In this case, the companion animal is potty trained so that it pees and poos at a specific place in the house. Generally, paper such as a newspaper or paper box is located at the specific place to absorb the water contained in the waste of the companion animal.

However, if the companion animal pees and poos on the paper such as a newspaper or paper box, the paper does not absorb the waste of the companion animal well because it is not made for the purpose of an animal waste treatment, thereby causing a bad odor and generating secondary contamination owing to the paper torn easily in a process of being treated. To solve such problems, recently, defecation pad treating devices have been used.

SUMMARY OF THE INVENTION

According to the conventional defecation pad treating devices, however, it is not easy to remove a defecation pad used and thus locate a new defecation pad.

Accordingly, the present invention has been made in view of the above-mentioned problems occurring in the related art, and it is an object of the present invention to provide a rod for a defecation pad and a defecation pad treating device having the same for a companion animal that are capable of being simple in configuration and easy to be used and then treated after the use. However, such an object of the present invention is exemplary so that the scope and spirit of the present invention is not limited thereto.

To accomplish the above-mentioned objects, according to one aspect of the present invention, a rod for a defecation pad may include: a first shaft extending in a first direction and having a cross section with the outer periphery of a semicircle or a portion of a semicircle perpendicular to the first direction; a second shaft extending in the first direction and having a cross section with the outer periphery of a semicircle or a portion of a semicircle perpendicular to the first direction; first fastening elements mounted on one of the first shaft and the second shaft; and second fastening elements mounted on the other of the first shaft and the second shaft to correspond to the first fastening element when the first shaft and the second shaft are coupled to each other.

The first fastening elements may come into close contact with the second fastening elements when the first shaft and the second shaft are coupled to each other.

The first fastening element may include a magnet and the second fastening element may include a ferromagnetic body or magnet.

At least portions of ones of the first fastening elements and the second fastening elements may be inserted into the other ones of the first fastening elements and the second fastening elements when the first shaft and the second shaft are coupled to each other.

When the first shaft and the second shaft are coupled to each other, the outer periphery of the semicircle or the portion of semicircle of the cross section of the first shaft perpendicular to the first direction may be convex in the direction distant from the second shaft, and the outer periphery of the semicircle or the portion of semicircle of the cross section of the second shaft perpendicular to the first direction may be convex in the direction distant from the first shaft.

The first shaft may have first teeth formed on the outer periphery of a front end portion thereof in the first direction, and the second shaft may have second teeth formed on the outer periphery of a front end portion thereof in the first direction, so that when the first shaft and the second shaft are coupled to each other, a gear with the first teeth and the second teeth may be formed on the outer periphery thereof.

The first shaft may have a first protrusion protruding from the opposite direction front end portion to the first direction in the direction distant from the center axis thereof, and the second shaft may have a second protrusion protruding from the opposite direction front end portion to the first direction in the direction distant from the center axis thereof, so that when the first shaft and the second shaft are coupled to each other, a locking portion having the first protrusion and the second protrusion may be formed on a second front end portion thereof in the opposite direction to the first direction.

When the first shaft and the second shaft are coupled to each other, the first front end portion in the first direction of the first shaft may come into close contact with the first front end portion in the first direction of the second shaft, and the second front end portion in the opposite direction to the first direction of the first shaft may come into close contact with the second front end portion in the opposite direction to the first direction of the second shaft, so that a first central portion between the first front end portion and the second front end portion of the first shaft may be spaced apart from a second central portion between the first front end portion and the second front end portion of the second shaft.

Lengths of the first central portion of the first shaft and the second central portion of the second shaft in the first direction may be greater than a width of the defecation pad wound thereonto.

To accomplish the above-mentioned objects, according to another aspect of the present invention, a rod for a defecation pad may include: a first shaft extending in a first direction and having an accommodation portion with an empty internal space formed on the front end portion in the first direction, while having a cross section with the outer periphery of a semicircle or a portion of a semicircle perpendicular to the first direction on the entire portion except the accommodation portion; and a second shaft extending in the first direction and having an insertion portion formed on the front end portion in the first direction and thus inserted into the accommodation portion, while having a cross section with the outer periphery of a semicircle or a portion of a semicircle perpendicular to the first direction on the entire portion except the insertion portion.

The accommodation portion may have teeth formed on the outer periphery thereof.

The first shaft may have first teeth formed on the outer periphery of a front end portion thereof in the opposite direction to the first direction, and the second shaft may have second teeth formed on the outer periphery of a front end portion thereof in the opposite direction to the first direction, so that when the first shaft and the second shaft are coupled to each other, a gear with the first teeth and the second teeth may be formed on the outer periphery of the front end portion thereof in the opposite direction to the first direction.

To accomplish the above-mentioned objects, according to yet another aspect of the present invention, a rod for a defecation pad may include: a first shaft extending in a first direction; a second shaft extending in the first direction and spaced apart from the first shaft in such a way that one end thereof is connected to one end of the first shaft; and a side fastening part detachably coupled to the other end of the first shaft and the other end of the second shaft.

The side fastening part SD' may have teeth T2 formed on the outer periphery thereof.

The first shaft and the second shaft may have teeth formed on one end outer peripheries connected to each other.

To accomplish the above-mentioned objects, according to still yet another aspect of the present invention, a defecation pad treating device may include: a winding frame having a lower cover and an upper cover relatively rotatably coupled to the lower cover so that when the upper cover is located at a first position, the upper cover allows the inside of the lower cover to be exposed to the outside, and when the upper cover is located at a second position, the upper cover allows the inside of the lower cover to be hidden from the outside, while an insertion hole is being formed between the upper cover and the lower cover; one of the rods for a defecation pad as mentioned above, detachably mounted onto the winding frame; a defecation pad stand detachably coupled to one side of the lower cover; and a defecation pad container located on the underside of the defecation pad stand to accommodate the defecation pad therein.

The defecation pad treating device may further include a handle located on one side of the defecation pad container and elastically supported against an elastic member to apply a given pressure to the underside of the defecation pad stand when the defecation pad container is located on the underside of the defecation pad stand.

At least a portion of the handle may be located above a top end of the defecation pad container when the defecation pad container is located at the outside of the defecation pad stand.

Other aspects, characteristics, and advantages of the disclosed rod for a defecation pad and defecation pad treating device will become apparent from the following description, the accompanying drawings and the appended claims.

According to the present invention, the rod for the defecation pad and the defecation pad treating device having the same for a companion animal are simple in configuration and easy to be used and then treated after the use. Of course, the scope and spirit of the present invention may not be limited by such effectiveness.

DETAILED DESCRIPTION OF THE INVENTION

Figure 1:
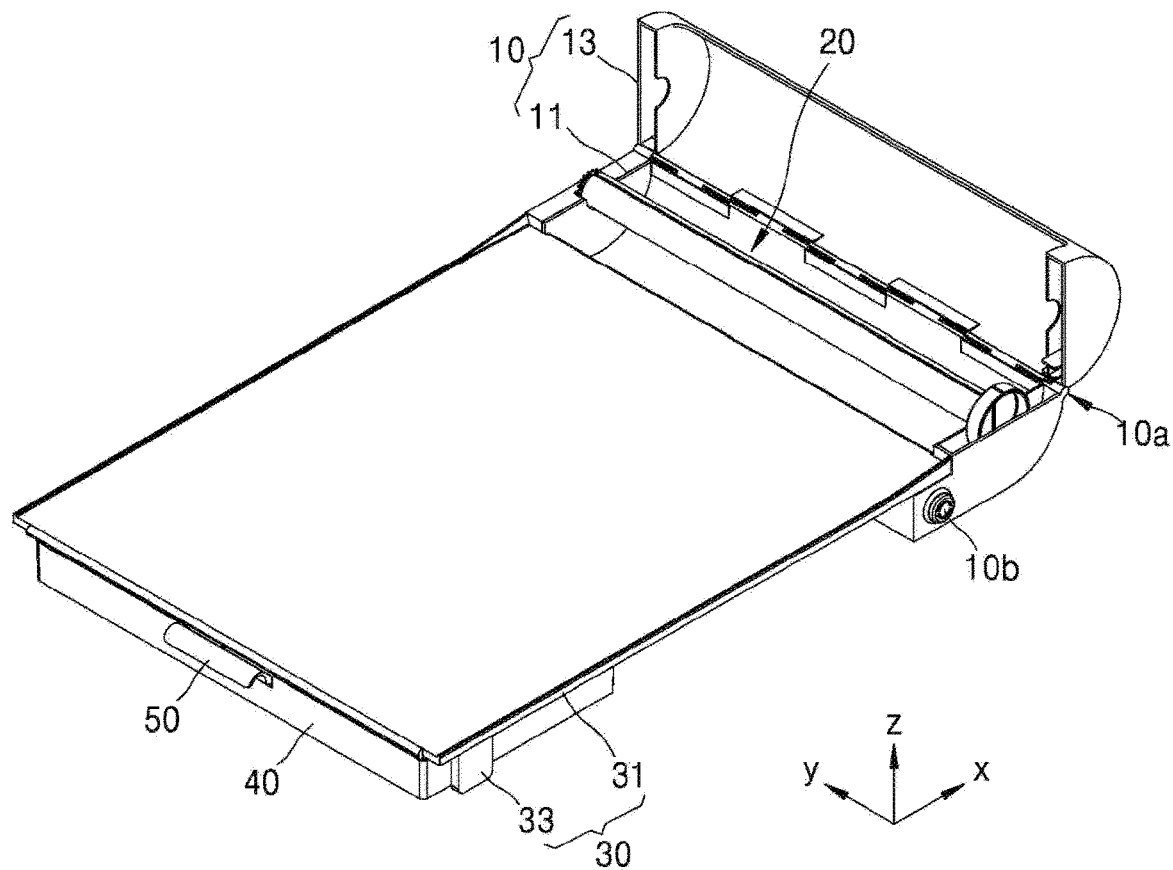
FIG. 1 is a perspective view showing a defecation pad treating device for a companion animal according to the present invention.

The present invention may be modified in various ways and may have several exemplary embodiments. Specific exemplary embodiments of the present invention are illustrated in the drawings and described in detail in the detailed description. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

Exemplary embodiments of the present invention will be described in detail below with reference to the accompanying drawings. In order to facilitate the general understanding of the present invention in describing the present invention, through the accompanying drawings, the same reference numerals will be used to describe the same components and an overlapped description of the same components will be omitted.

In the description, when it is said that a layer, a film, a region, or a plate is located "on" or "under" another layer, region, pattern, or structure, it means that one layer may come into contact with another layer as well as yet another layer may exist between the two layers. In the description, the thicknesses of the lines or the sizes of the components shown in the drawing may be magnified for the clarity and convenience of the description.

In the embodiments as will be discussed later, x, y and z-axes are not limited as three axes on an orthogonal coordinate system but considered as wide meaning including the three axes. For example, the x, y and z-axes may be perpendicular to one another, but they may have different directions not perpendicular to one another.

Figure 2:
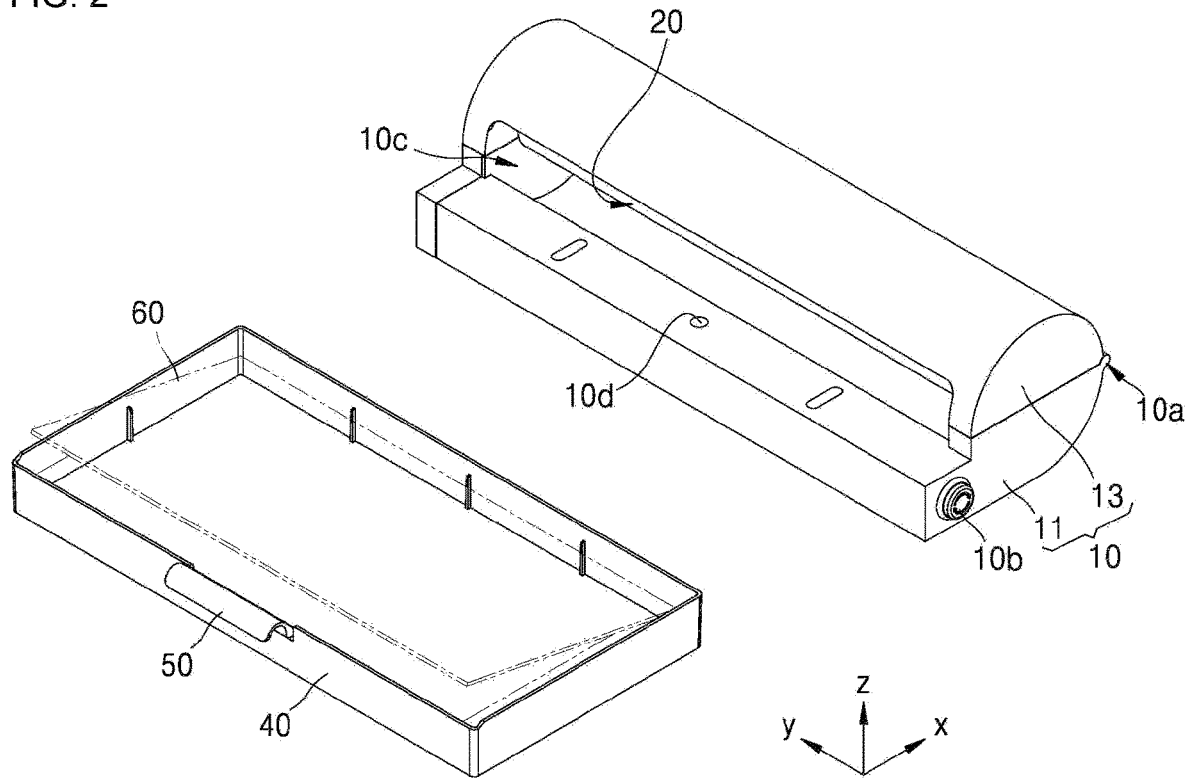
FIG. 2 is a perspective view showing some components of the defecation pad treating device for a companion animal of FIG. 1.

FIG. 1 is a perspective view showing a defecation pad treating device for a companion animal according to the present invention, and FIG. 2 is a perspective view showing some components of the defecation pad treating device for a companion animal of FIG. 1. The defecation pad treating device for a companion animal according to the present invention includes a winding frame 10, a rod 20 for a defecation pad, a defecation pad stand 30, and a defecation pad container 40.

The winding frame 10 includes a lower cover 11 and an upper cover 13.

Even if excrement of the companion animal escapes from a defecation pad 60 in a process where the portion of the defecation pad 60 located on the defecation pad stand 30 is wound onto the rod 20, it can be seated onto the lower cover 11. Accordingly, a user cleans only the lower cover 11, thereby keeping the defecation pad treating device in a clean state.

The upper cover 13 is coupled to the lower cover 11 and thus rotatable relative to the lower cover 11. In FIGS. 1 and 2, the upper cover 13 is relatively rotatable to the lower cover 11 around a rotary shaft 10a. As shown in FIG. 1, if the upper cover 13 is located at a first position, the upper cover 13 allows the inside of the lower cover 11 to be exposed to the outside. As shown in FIG. 2, if the upper cover 13 is located at a second position, the upper cover 13 allows the inside of the lower cover 11 to be hidden from the outside, while an insertion hole 10c is being formed between the upper cover 13 and the lower cover 11.

The defecation pad stand 30 includes a defecation pad panel 31 and supports 33. The defecation pad panel 31 determines the whole shape of the defecation pad stand 30 and has top approximately parallel to xy plane. The defecation pad 60 as will be discussed later is located on top of the defecation pad stand 30, and accordingly, the defecation pad stand 30 is used as a place on which the companion animal pees and poos. The defecation pad stand 30 is made of a metal and/or plastic.

The defecation pad container 40 is located on the underside of the defecation pad stand 30. The defecation pad container 40 accommodates the defecation pad 60 absorbing at least a portion of the excrement of the companion animal. The defecation pad 60 includes, for example, an absorbing layer made of a pulp material. The defecation pad 60 is folded by a plurality of times sequentially in the shape of zigzag alternately on one side thereof (in the direction of +x-axis) and on the other side thereof (in the direction of −x-axis).

If the defecation pad 60 accommodated in the defecation pad container 40 is used up, a new defecation pad 60 is accommodated in the defecation pad container 40. To allow the new defecation pad 60 to be easily accommodated in the defecation pad container 40, the defecation pad container 40 slides relative to the defecation pad stand 30 (in the direction of +x-axis or −x-axis). In specific, the defecation pad container 40 has a desk drawer-like shape so that it can slide relative to the defecation pad stand 30.

Figure 3:
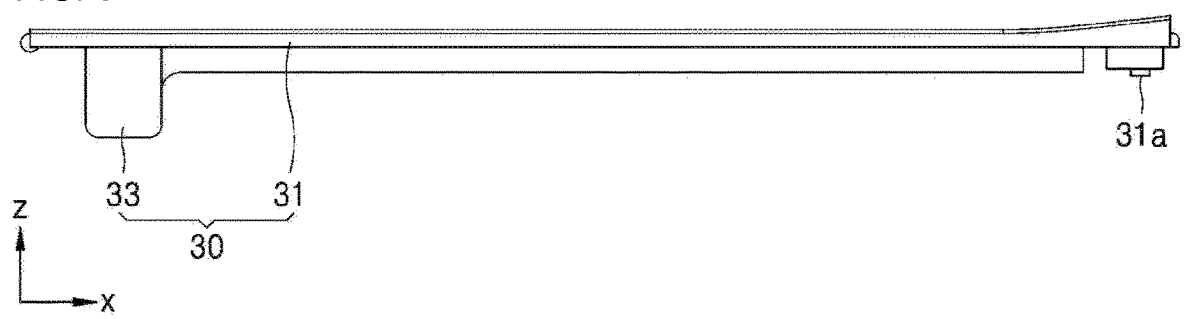
FIG. 3 is a side view showing a defecation pad stand of the defecation pad treating device for a companion animal of FIG. 1.

To allow the defecation pad container 40 to easily slide relative to the defecation pad stand 30, as shown in FIGS. 1 and 3, the defecation pad stand 30 includes the supports 33 coupled to both edges (in the directions of +y-axis and −y-axis) of the defecation pad panel 31. A distance between the underside (in the direction of −z-axis) of the defecation pad panel 31 and the underside (in the direction of −z-axis) of each support 33 is longer than a distance between the top (in the direction of +z-axis) of the defecation pad container 40 and the underside (in the direction of −z-axis) of the defecation pad container 40. As a result, the top (in the direction of +z-axis) of the defecation pad container 40 is spaced apart from the underside of the defecation pad panel 31, thereby allowing the defecation pad container 40 to easily slide relative to the defecation pad stand 30.

Further, the defecation pad stand 30 is detachably coupled to one side (in the direction of −x) of the lower cover 11. To do this, as shown in FIG. 3, the defecation pad panel 31 of the defecation pad stand 30 has a convex portion 31a formed on one side of the underside (in the direction of +x-axis) thereof, and as shown in FIG. 2, the lower cover 11 has a concave portion 10d formed on one side (in the direction of −x-axis) thereof. Accordingly, the convex portion 31a of the defecation pad stand 30 is inserted into the concave portion 10d of the lower cover 11, so that the relative position of the defecation pad stand 30 to the winding frame 10 having the lower cover 11 is fixed.

The rod 20 for the defecation pad 60 is detachably mounted onto the winding frame 10. The rod 20 for the defecation pad 60 is made of a metal or plastic.

Under the above-mentioned configuration of the defecation pad treating device according to the present invention, the defecation pad 60 accommodated in the defecation pad container 40 moves top of the defecation pad stand 30 from the opposite direction end (in the direction of −x-axis) of the defecation pad stand 30 to the direction toward the winding frame 10, passes through the insertion hole 10c formed between the lower cover 11 and the upper cover 13 of the winding frame 10, and is coupled to the rod 20 for the defecation pad 60. In this state, if the companion animal pees and poos on the portion of the defecation pad 60 located on the defecation pad stand 30, at least a portion of the excrement is absorbed onto the defecation pad 60. If the portion of the defecation pad 60 located on the defecation pad stand 30 is contaminated, the rod 20 for the defecation pad 60 rotates to wind the portion of the defecation pad 60 located on the defecation pad stand 30 thereonto, and a portion of the defecation pad 60, which is not contaminated yet, is newly located on the defecation pad stand 30. As a result, the contaminated portion of the defecation pad 60 is easily replaced.

Further, the defecation pad treating device according to the present invention includes a handle 50 located on one side (in the direction of −x-axis) of the defecation pad container 40. As mentioned above, the defecation pad container 40 is located on the underside of the defecation pad stand 30. If the defecation pad 60 accommodated in the defecation pad container 40 is used up, the defecation pad container 40 slides relative to the defecation pad stand 30 (in the direction of +x-axis or −x-axis) so that a new defecation pad 60 is accommodated in the defecation pad container 40. In this case, as the handle 50 located on one side (in the direction of −x-axis) of the defecation pad container 40 is controlled by a user, the defecation pad container 40 can easily slide relative to the defecation pad stand 30 (in the direction of +x-axis or −x-axis).

Figure 4:
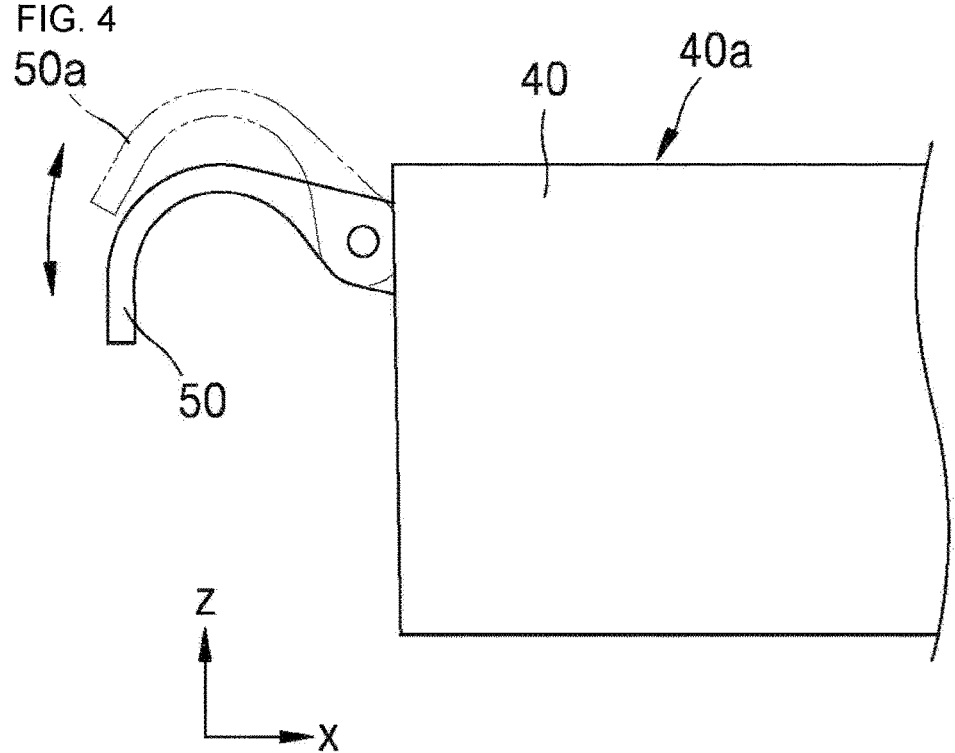
FIG. 4 is a side view showing a portion of a defecation pad container of the defecation pad treating device for a companion animal of FIG. 1.

In this case, the handle 50 is elastically supported against an elastic member such as a spring and the like. As shown in FIG. 4 showing a portion of the defecation pad container of the defecation pad treating device for a companion animal of FIG. 1, the handle 50 may be disposed on various positions. For example, if the handle 50 is located on the outside of the defecation pad stand 30, it is located to the form of a handle 50a by means of the elasticity of the elastic member such as a spring and the like. In this case, at least a portion of the handle 50a is located above a top end 40a (in the direction of +z-axis) of the defecation pad container 40. If the handle 50 is located under the defecation pad stand 30 (in the direction of −z-axis), the handle 50 comes into close contact with the underside of the defecation pad panel 31 of the defecation pad stand 30 upon the non-existence of the defecation pad 60. Accordingly, the handle 50 applies a given pressure to the underside of the defecation pad panel 31 of the defecation pad stand 30 by means of the elasticity of the elastic member such as a spring and the like.

As mentioned above, under the above-mentioned configuration of the defecation pad treating device according to the present invention, the defecation pad 60 accommodated in the defecation pad container 40 moves top of the defecation pad stand 30 from the opposite direction end (in the direction of −x-axis) of the defecation pad stand 30 to the direction toward the winding frame 10, passes through the insertion hole 10c formed between the lower cover 11 and the upper cover 13 of the winding frame 10, and is coupled to the rod 20 for the defecation pad 60. In this case, the handle 50 is located under the defecation pad stand 30 (in the direction of −z-axis), and accordingly, the handle 50 applies a given pressure to the underside of the defecation pad panel 31 of the defecation pad stand 30 by means of the elasticity of the elastic member such as a spring and the like. As a result, the given pressure is applied to the defecation pad 60 placed between the handle 50 and the defecation pad panel 31.

If the companion animal pees and poos on the portion of the defecation pad 60 located on the defecation pad stand 30, at least some of the excrement are absorbed onto the defecation pad 60. If the portion of the defecation pad 60 located on the defecation pad stand 30 is contaminated, the rod 20 for the defecation pad 60 rotates to wind the portion of the defecation pad 60 located on the defecation pad stand 30 thereonto, and a portion of the defecation pad 60, which is not contaminated yet, is newly located on the defecation pad stand 30. As a result, the contaminated portion of the defecation pad 60 is easily replaced. In this case, in the state where the given pressure of the handle 50 is applied to the defecation pad 60 placed between the handle 50 and the defecation pad panel 31, the rod 20 for the defecation pad 60 rotates to wind the defecation pad 60 thereonto. Accordingly, an unnecessary bent portion can be prevented from being formed on the portion of the defecation pad 60 on top (in the direction of +z-axis) of the defecation pad panel 31, so that the portion of the defecation pad 60 located on top (in the direction of +z-axis) of the defecation pad panel 31 can be kept in a tight state.

Figure 5:
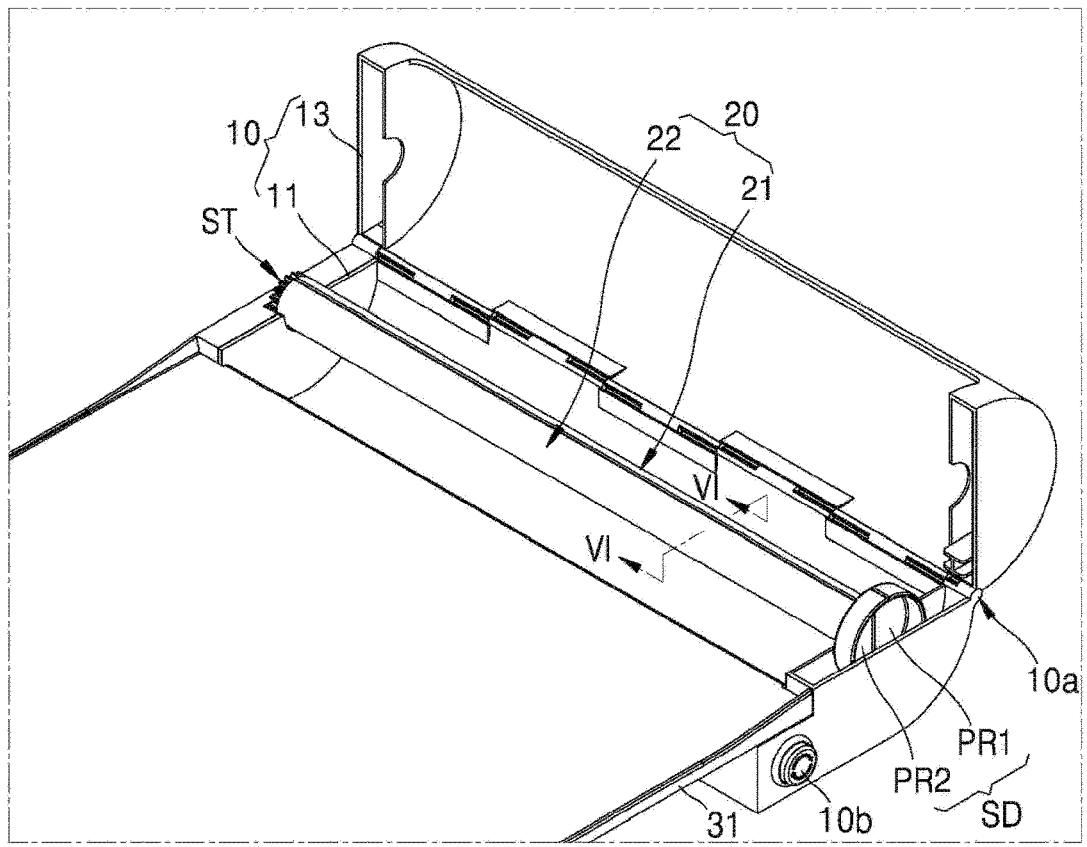
FIG. 5 is a perspective view showing a winding frame and a rod for a defecation pad of the defecation pad treating device for a companion animal of FIG. 1.
Figure 6:
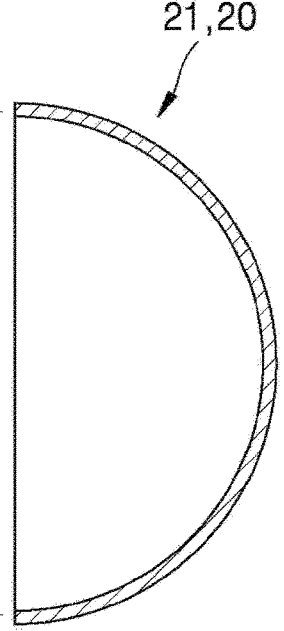
FIG. 6 is a sectional view taken along the line VI-VI of FIG. 5.
Figure 7:
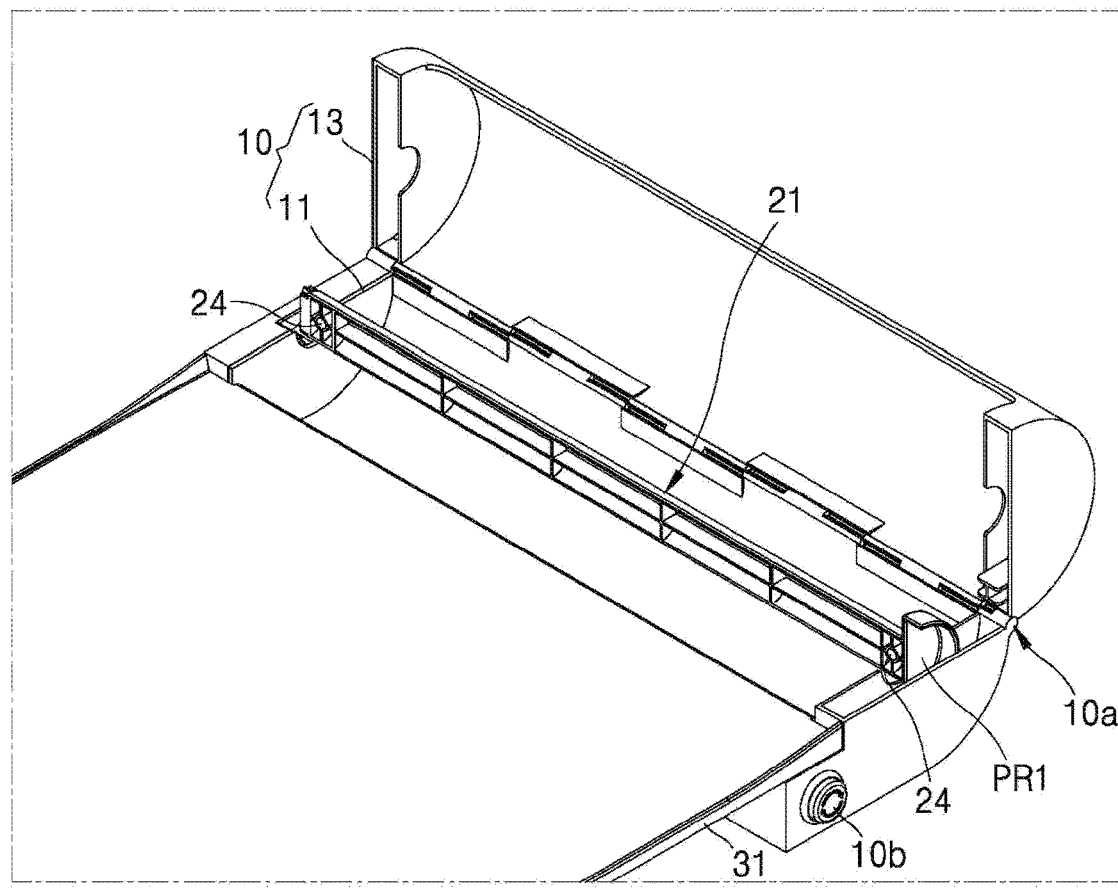
FIG. 7 is a perspective view showing the rod for a defecation pad.

FIG. 5 is a perspective view showing the winding frame 10 and the rod 20 for the defecation pad 60 of the defecation pad treating device for a companion animal of FIG. 1, FIG. 6 is a sectional view taken along the line VI-VI of FIG. 5, and FIG. 7 is a perspective view showing the rod 20 for the defecation pad 60.

As shown in FIGS. 5 and 6, the rod 20 for the defecation pad 60 includes a first shaft 21 and a second shaft 22 that are physically separated from each other. The physically separated first and second shafts 21 and 22 come into contact with each other, that is, are fastened to each other to provide the shape of the rod 20 for the defecation pad 60, and of course, the first shaft 21 and the second shaft 22 may be separated from each other, without any contact, which will be discussed later.

The first shaft 21 extends in a first direction (in the direction of +y-axis) and has a cross section with the outer periphery of a semicircle or a portion of a semicircle perpendicular to the first direction. In FIG. 6, the cross section of the first shaft 21 perpendicular to the first direction (in the direction of +y-axis) at the center of the first shaft 21 has the shape of a semicircle. The second shaft 22 extends in the first direction (in the direction of +y-axis) and has a cross section with the outer periphery of a semicircle or a portion of a semicircle perpendicular to the first direction. In FIG. 6, the cross section of the second shaft 22 perpendicular to the first direction (in the direction of +y-axis) at the center of the second shaft 22 has the shape of a semicircle.

When the first shaft 21 and the second shaft 22 are coupled to each other, as shown in FIG. 6, the outer periphery of the semicircle or the portion of semicircle of the cross section of the first shaft 21 perpendicular to the first direction (in the direction of +y-axis) is convex in the direction distant from the second shaft 22 (in the direction of +x-axis). Further, the outer periphery of the semicircle or the portion of semicircle of the cross section of the second shaft 22 perpendicular to the first direction (in the direction of +y-axis) is convex in the direction distant from the first shaft 21 (in the direction of −x-axis).

The rod 20 for the defecation pad 60 includes first fastening elements 24 having magnets mounted on one of the first shaft 21 and the second shaft 22. Further, the rod 20 for the defecation pad 60 includes second fastening elements having ferromagnets or magnets mounted on the other of the first shaft 21 and the second shaft 22.

In FIG. 7, the first fastening elements 24 having magnets are mounted on the first shaft 21, and in specific, the first fastening elements 24 having magnets are mounted on the front side of the first shaft 21 in the first direction (in the direction of +y-axis) and on the front side of the first shaft 21 in the opposite direction (in the direction of −y-axis) to the first direction (in the direction of +y-axis). In this case, the second fastening elements having ferromagnets or magnets are mounted on the second shaft 22. If the first shaft 21 and the second shaft 22 come into contact with each other, that is, are fastened to each other, the second fastening elements are located on the second shaft 22 to correspond to the first fastening elements 24, that is, to come into contact with the first fastening elements 24. Accordingly, when the first shaft 21 and the second shaft 22 are coupled to each other, as shown in FIG. 5, attractive forces are generated between the first fastening elements 24 and the second fastening elements to allow the first shaft 21 and the second shaft 22 to be fastened to each other, thereby providing the shape of the rod 20 for the defecation pad 60. When the first shaft 21 and the second shaft 22 are coupled to each other, the first fastening elements 24 and the second fastening elements come into close contact with each other.

Figure 8:
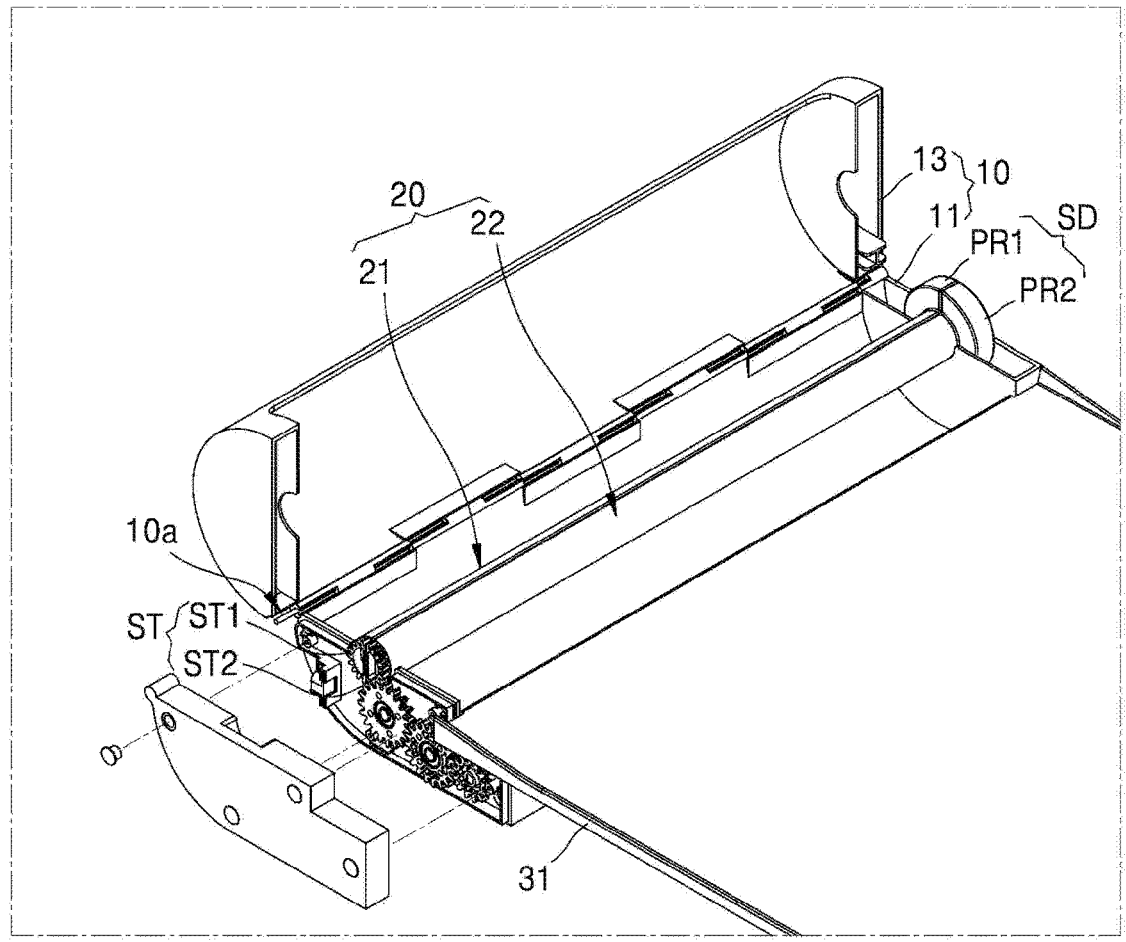
FIG. 8 is a perspective view showing an operating principle of the defecation pad treating device for a companion animal of FIG. 1.
Figure 8:
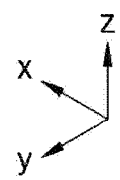

The first shaft 21 has first teeth ST1 formed on the outer periphery of a front end portion thereof in the first direction (in the direction of +y-axis), and the second shaft 22 has second teeth ST2 formed on the outer periphery of a front end portion thereof in the first direction (in the direction of +y-axis). The first teeth ST1 are arranged along the trace of a roughly semicircular shape, and in the same manner as above, the second teeth ST2 are arranged along the trace of a roughly semicircular shape. When the first shaft 21 and the second shaft 22 are coupled to each other, as shown in FIG. 8, a gear ST with the first teeth ST1 and the second teeth ST2 is formed on the outer periphery of the first front end portion (in the direction of +y-axis) of the rod 20 for the defecation pad 60.

The defecation pad treating device for a companion animal according to the present invention further includes a motor. The motor is located inside the winding frame 10, and if the motor operates, it rotates the rod 20 for the defecation pad 60. As shown in FIG. 8, a drive gear is connected to a rotary shaft of the motor and thus engages with a first intermediate gear engaging with a second intermediate gear, and the second intermediate gear thus engages with the gear ST of the rod 20 for the defecation pad 60. In the state, if the motor operates, the rod 20 for the defecation pad 60 rotates around the center axis extending in the first direction (in the direction of +y-axis) to wind the defecation pad 60 thereonto.

As shown in FIG. 1, the operation of the motor is performed by means of the control of a button 10*b* located at one side of the winding frame 10. If the button 10*b* is pushed by the user, the motor operates. For example, the motor operates for a period of time during which the button 10*b* is pushed by the user. Otherwise, if the button 10*b* is pushed continuously two times at short intervals, an automatic mode in which the motor automatically operates is turned on. In the state, if the button 10*b* is pushed continuously again two times at short intervals, the automatic mode is turned off. In the case of the automatic mode, the motor operates for a predetermined period of time.

Figure 9:
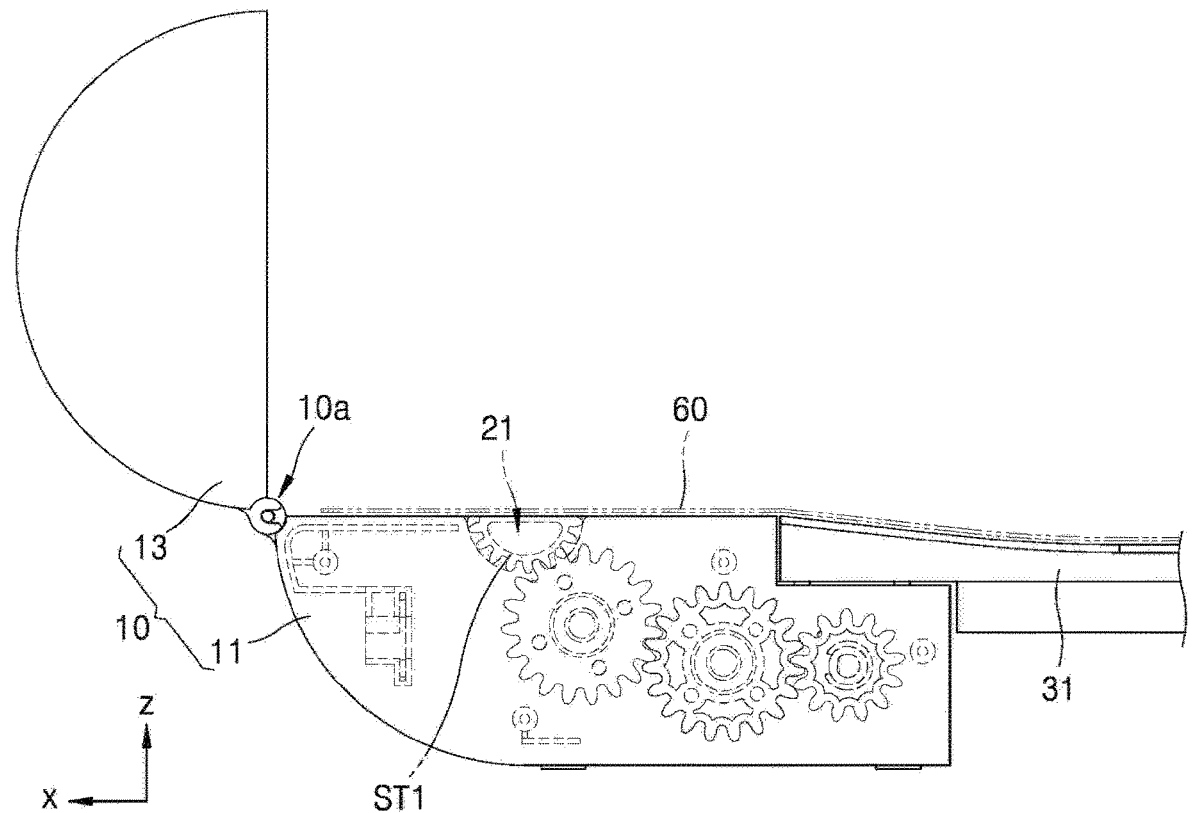
FIGS. 9 and 10 are side views showing the operating principle of the defecation pad treating device for a companion animal of FIG. 1.
Figure 10:
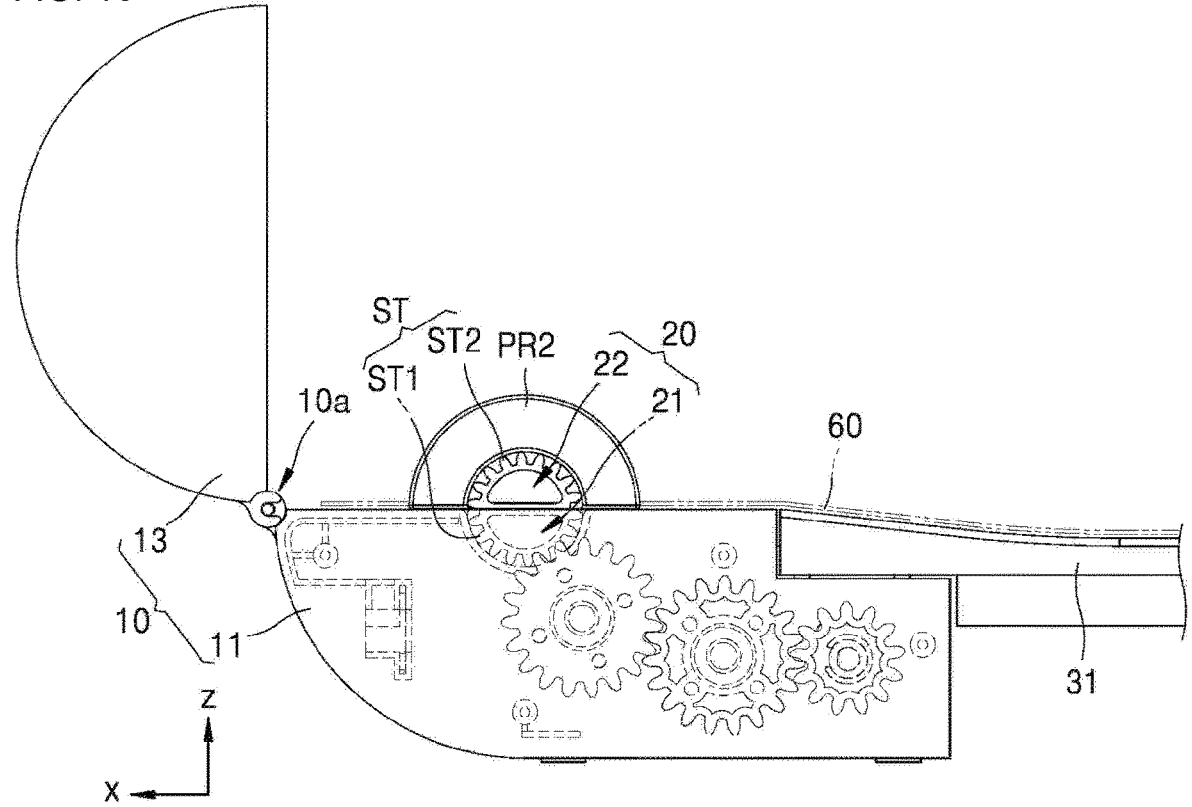

FIGS. 9 and 10 are side views showing the operating principle of the defecation pad treating device for a companion animal of FIG. 1. As shown in FIG. 9, first, the upper cover 13 rotates around the rotary shaft 10*a* and is thus located at the first position so that the inside of the lower cover 11 is exposed to the outside, and next, the first shaft 21 and the second shaft 22 of the rod 20 for the defecation pad 60 are separated from each other so that only one shaft is located within the winding frame 10. In FIG. 9, the first shaft 21 is located within the winding frame 10 for the convenience of the description. In this case, the convex portion of the first shaft 21 is oriented downward.

In the state, the end of the defecation pad 60 in the defecation pad container 40 is pulled to move the opposite direction end (in the direction of −x-axis) to the direction toward the winding frame 10, top of the defecation pad stand 30, the first shaft 21, and the inner side of the winding frame 10, sequentially. Next, as shown in FIG. 10, the second shaft 22 is coupled to the first shaft 21. A portion of the defecation pad 60 is placed between the first shaft 21 and the second shaft 22, and the first shaft 21 and the second shaft 22 are coupled to each other by means of the first fastening elements 24 and the second fastening elements. In the state, the upper cover 13 rotates around the rotary shaft 10*a* and is thus located at the second position so that the inside of the lower cover 11 is closed and the insertion hole 10*c* is formed between the lower cover 11 and the upper cover 13. In this case, if the motor of the winding frame 10 operates, the rod 20 for the defecation pad 60 rotates around the center axis extending in the first direction (in the direction of +y-axis) to wind the defecation pad 60 thereonto.

According to the present invention, like this, the defecation pad 60 is simply coupled to the rod 20 for the defecation pad 60, thereby drastically improving the conveniences of use.

Further, the first shaft 21 has a first protrusion PR1 protruding from the opposite direction front end portion (in the direction of −y-axis) to the first direction in the direction distant from the center axis thereof, and the second shaft 22 has a second protrusion PR2 protruding from the opposite direction front end portion (in the direction of −y-axis) to the first direction in the direction distant from the center axis thereof. When the first shaft 21 and the second shaft 22 are coupled to each other, accordingly, a locking portion SD having the first protrusion PR1 and the second protrusion PR2 is formed on a second front end portion in the opposite direction (in the direction of −y-axis) to the first direction. As shown in FIG. 1, the locking portion SD is mounted over a predetermined portion in the winding frame 10 when the rod 20 for the defecation pad 60 is located within the winding frame 20, so that the rod 20 for the defecation pad 60 is fixed in position within the winding frame 10.

Figure 11:
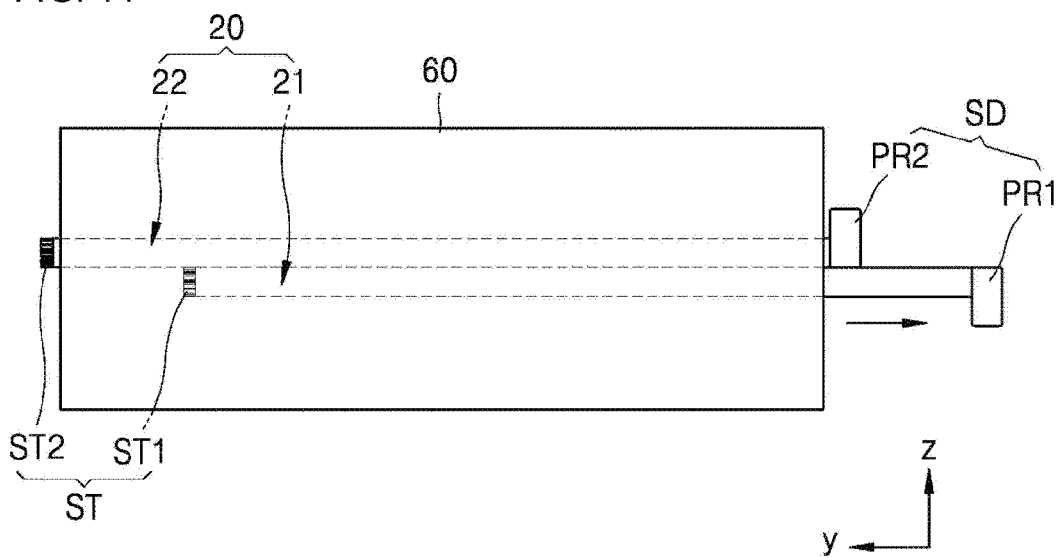
FIG. 11 is a plan view showing a method of using the rod for a defecation pad.

FIG. 11 is a plan view showing a method of using the rod 20 for the defecation pad 60. If the portion of the defecation pad 60 located on the defecation pad stand 30 is contaminated, the rod 20 for the defecation pad 60 rotates to wind the portion of the defecation pad 60 located on the defecation pad stand 30 thereonto. If such operations are repeatedly performed, as shown in FIG. 11, the contaminated defecation pad 60 of a high thickness is wound onto the rod 20. To reuse the rod 20, it is necessary to remove the wound defecation pad 60 from the rod 20.

As mentioned above, the first shaft 21 and the second shaft 22 of the rod 20 for the defecation pad 60 are coupled to each other by means of the magnets, and accordingly, they can be easily separated from each other. Through the first protrusion PR1 of the first shaft 21 and the second protrusion PR2 of the second shaft 22, one of the first shaft 21 and the second shaft 22 slides relative to the other in the first direction (in the direction of +y-axis) or in the opposite direction to the first direction. As shown in FIG. 11, one of the first shaft 21 and the second shaft 22 separated from each other slides in the first direction (in the direction of +y-axis) or in the opposite direction to the first direction and is thus discharged from the defecation pad 60 to the outside, and next, the other is discharged from the defecation pad 60 to the outside, so that the rod 20 is easily separated from the wound defecation pad 60 thereonto.

Figure 12:
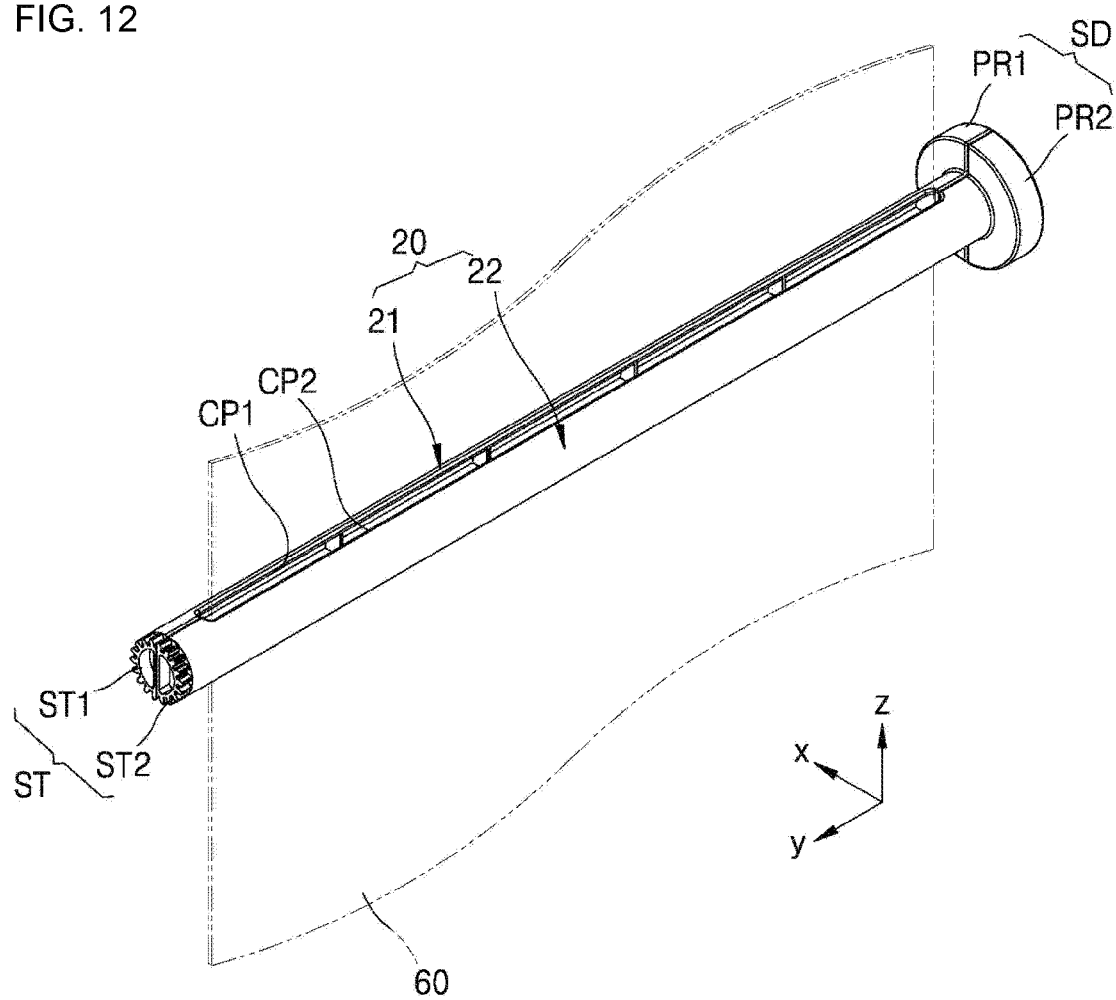
FIG. 12 is a perspective view showing another example of the rod for a defecation pad according to the present invention.

FIG. 12 is a perspective view showing another example of the rod 20 for the defecation pad 60 according to the present invention. According to another example of the rod 20 for the defecation pad 60, when the first shaft 21 and the second shaft 22 are coupled to each other, the first front end portion in the first direction (in the direction of +y-axis) of the first shaft 21 comes into close contact with the first front end portion in the first direction (in the direction of +y-axis) of the second shaft 22, and the second front end portion in the opposite direction (in the direction of −y-axis) to the first direction of the first shaft 21 comes into close contact with the second front end portion in the opposite direction (in the direction of −y-axis) to the first direction of the second shaft 22. In this case, a first central portion between the first front end portion and the second front end portion of the first shaft 21 is spaced apart from a second central portion between the first front end portion and the second front end portion of the second shaft 22. In FIG. 12, the first shaft 21 has a first concave portion CP1, and the second shaft 22 has a second concave portion CP2, so that the first central portion of the first shaft 21 is spaced apart from the second central portion of the second shaft 22.

According to another example of the rod 20 for the defecation pad 60, when the defecation pad 60 is disposed between the first shaft 21 and the second shaft 22, it passes through the space between the first concave portion CP1 of the first shaft 21 and the second concave portion CP2 of the second shaft 22. To do this, lengths of the first central portion of the first shaft 21 and the second central portion of the second shaft 22 in the first direction (in the direction of +y-axis) are greater than a width of the defecation pad 60 in the first direction (in the direction of +y-axis).

As mentioned with reference to FIG. 11, if it is desired to separate the rod 20 for the defecation pad 60 from the wound defecation pad 60 thereonto, one of the first shaft 21 and the second shaft 22 slides relative to the other.

Since a portion of the defecation pad 60 is placed between the first shaft 21 and the second shaft 22 (See FIGS. 9 and 10), one of first shaft 21 and the second shaft 22 may not slide gently relative to the other by means of the friction of the portion of the defecation pad 60 against the first shaft 21 and the second shaft 22. According to another example of the rod 20 for the defecation pad 60, however, the first shaft 21 has the first concave portion CP1 and the second shaft 22 has the second concave portion CP2, so that when one of the first shaft 21 and the second shaft 22 slides relative to the other, the friction of the defecation pad 60 against the first shaft 21 and the second shaft 22 is reduced. Accordingly, the rod 20 for the defecation pad 60 is easily separated from the wound defecation pad 60 thereonto.

Figure 13:
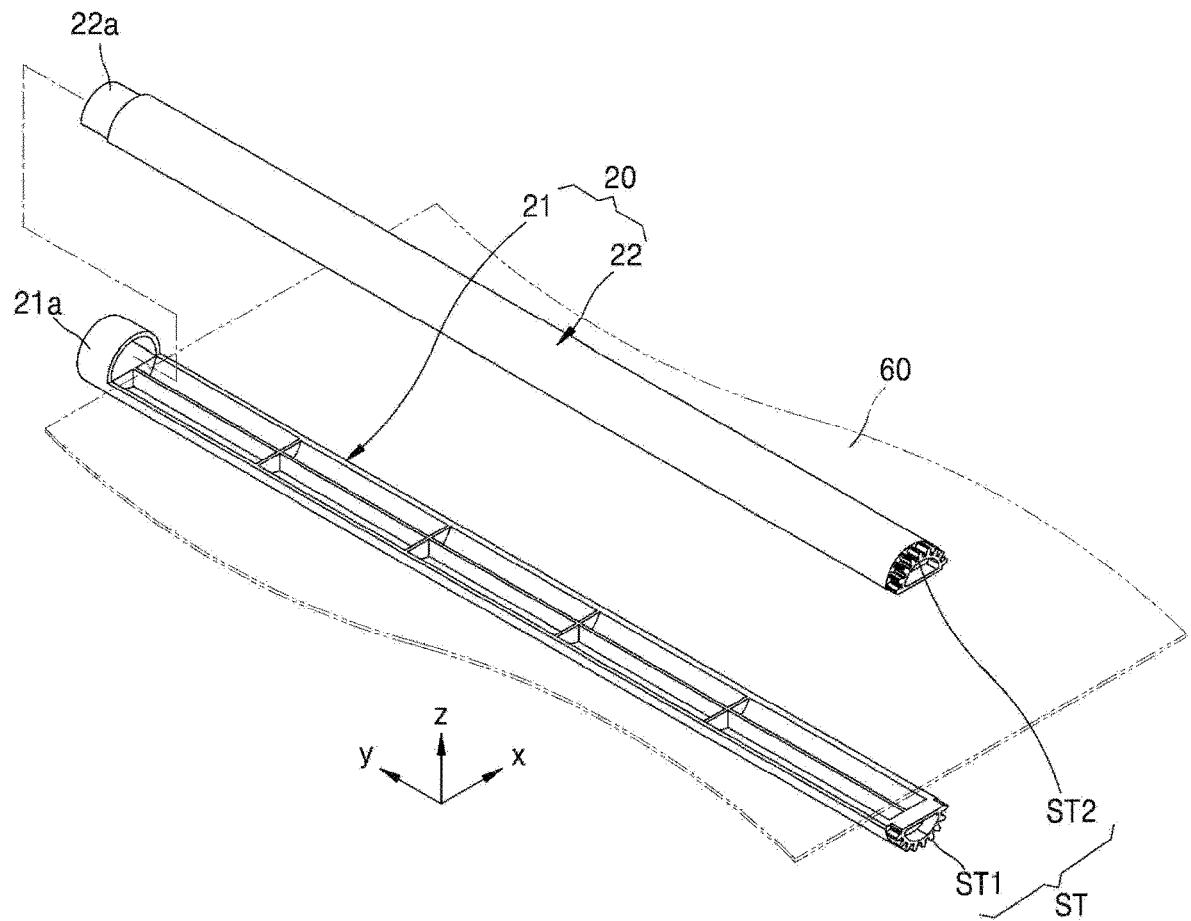
FIG. 13 is an exploded perspective view showing yet another example of the rod for a defecation pad according to the present invention.

FIG. 13 is an exploded perspective view showing yet another example of the rod 20 for the defecation pad 60 according to the present invention. According to yet another example of the rod 20 for the defecation pad 60, in the same manner as above, the first shaft 21 and the second shaft 22 are provided. The first shaft 21 extends in the first direction (in the direction of +y-axis) and has an accommodation portion 21a with an empty internal space as a first fastening element formed on the front end portion in the first direction (in the direction of +y-axis), while having a cross section with the outer periphery of a semicircle or a portion of a semicircle perpendicular to the first direction on the entire portion except the accommodation portion 21a. The second shaft 22 extends in the first direction (in the direction of +y-axis) and has an insertion portion 22a as a second fastening element formed on the front end portion in the first direction (in the direction of +y-axis) and thus inserted into the accommodation portion 21a, while having a cross section with the outer periphery of a semicircle or a portion of a semicircle perpendicular to the first direction on the entire portion except the insertion portion 22a.

According to yet another example of the rod 20 for the defecation pad 60, after the defecation pad 60 is disposed between the first shaft 21 and the second shaft 22, the second shaft 22 slides relative to the first shaft 21 to move (insert) the insertion portion 22a into the accommodation portion 21a until the insertion portion 22a comes into close contact with the accommodation portion 21a, so that the first shaft 21 and the second shaft 22 physically separated from each other are coupled.

The rod 20 for the defecation pad 60 have teeth so that it is mounted in the winding frame 10 as shown in FIG. 1. In FIG. 13, the first teeth ST1 are formed on the outer periphery of the front end portion of the first shaft 21 in the opposite direction (in the direction of −y-axis) to the first direction, and the second teeth ST2 are formed on the outer periphery of the front end portion of the second shaft 22 in the opposite direction (in the direction of −y-axis) to the first direction. When the first shaft 21 and the second shaft 22 are coupled to each other, accordingly, a gear ST with the first teeth ST1 and the second teeth ST2 is formed on the outer periphery of the front end portion (of the direction of +y-axis) of the rod 20 for the defecation pad 60 in the opposite direction (in the direction of −y-axis) to the first direction. Of course, the present invention may not be limited thereto, and the teeth T1 may be formed on the outer periphery of the accommodation portion 21a. However, even the defecation pad treating device having such a rod may be within the scope and spirit of the present invention.

Figure 14:
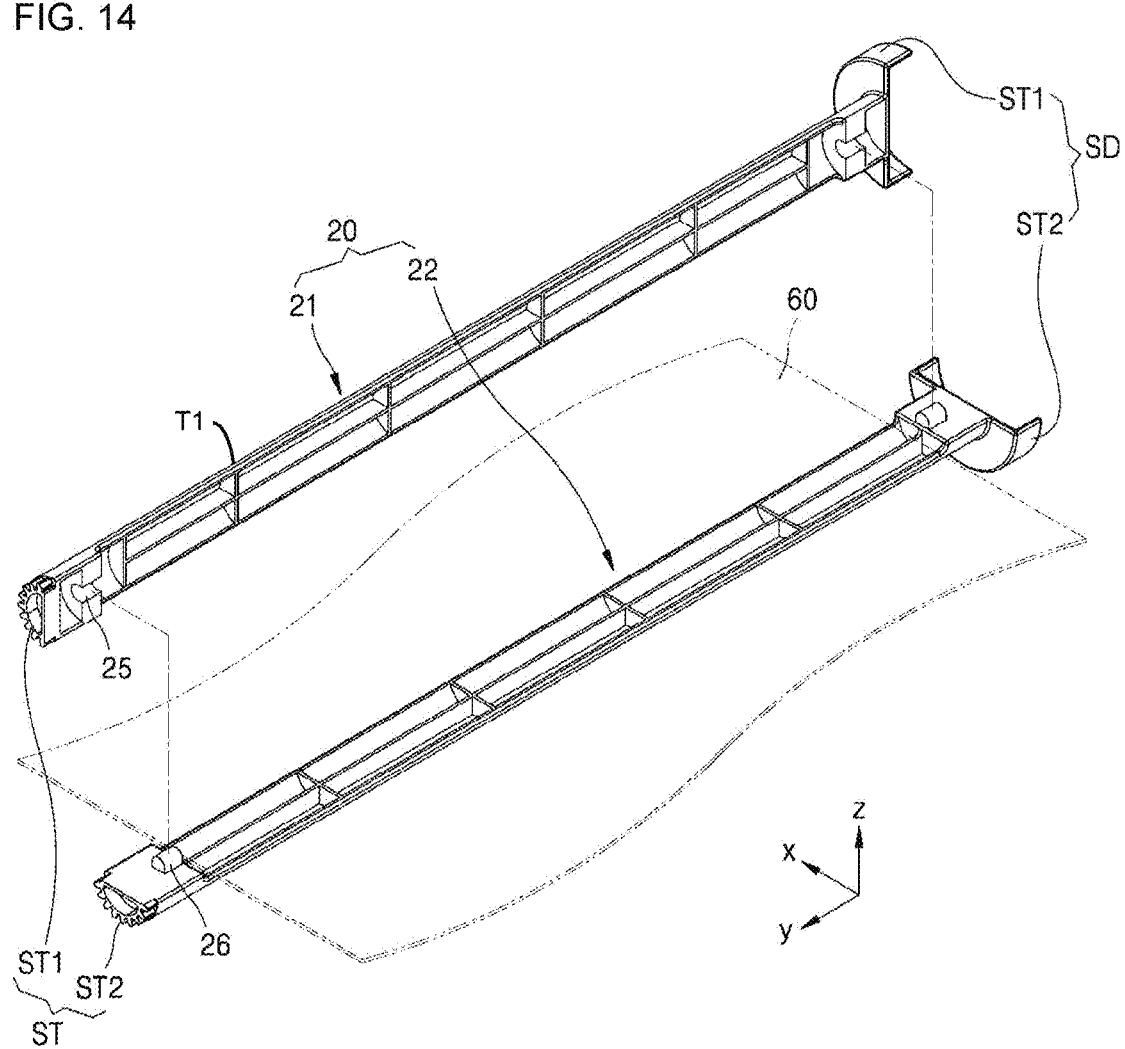
FIG. 14 is an exploded perspective view showing still another example of the rod for a defecation pad according to the present invention.
Figure 15:
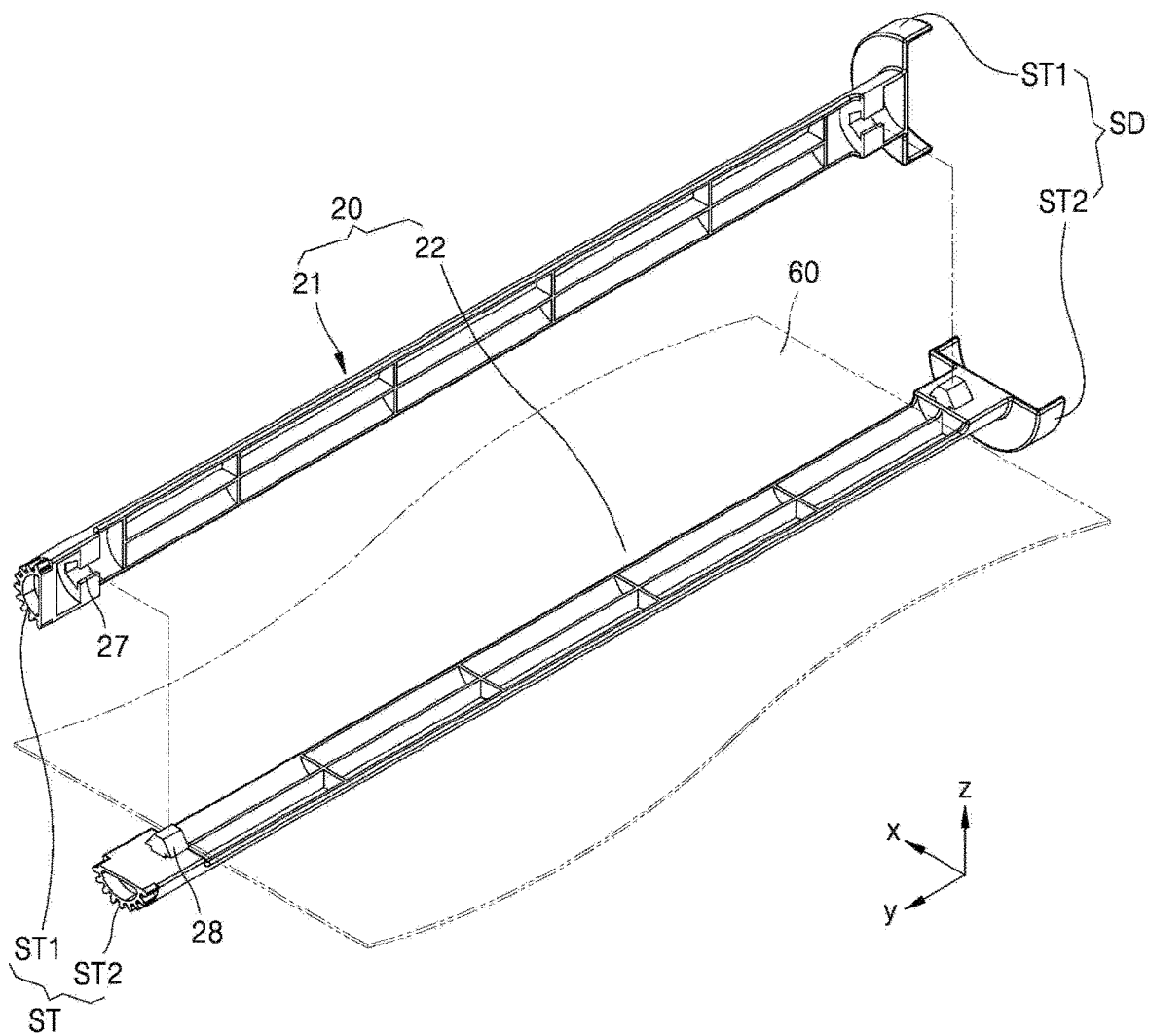
FIG. 15 is an exploded perspective view showing yet still another example of the rod for a defecation pad according to the present invention.
Figure 16:
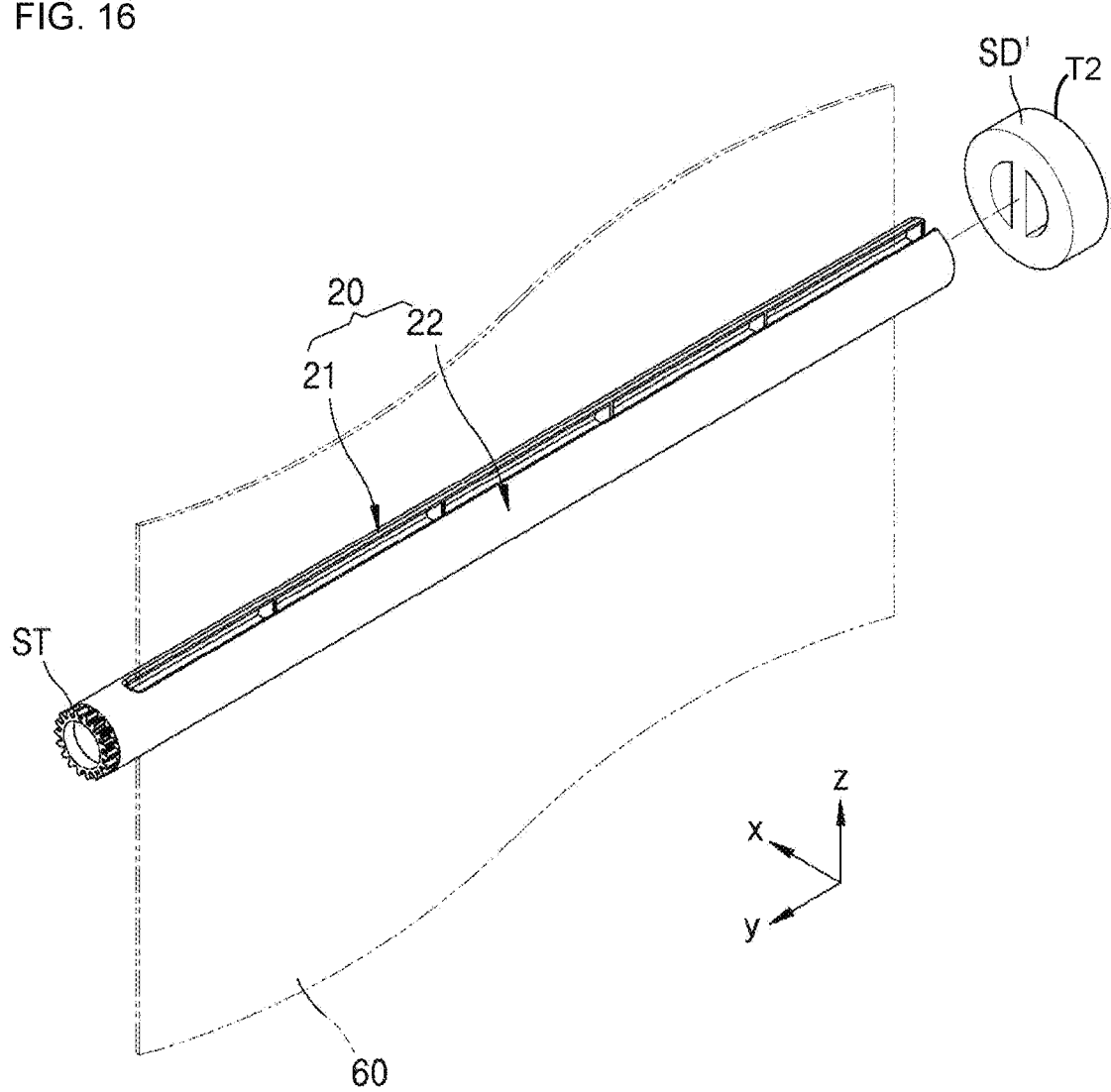
FIG. 16 is a perspective view showing yet another example of the rod for a defecation pad according to the present invention.

Hereinafter, other examples of the rod 20 for the defecation pad 60 according to the present invention will be explained with reference to FIGS. 14 to 16. The defecation pad winding rods 20 as shown in FIGS. 14 to 16 have teeth so that each is mounted in the winding frame 10 as shown in FIG. 1. That is, the defecation pad treating device having the rods 20 as shown in FIGS. 14 to 16 may be within the scope and spirit of the present invention.

FIG. 14 is an exploded perspective view showing still another example of the rod 20 for the defecation pad 60 according to the present invention. As shown, the rod 20 for the defecation pad 60 includes the first shaft 21 and the second shaft 22. The first shaft 21 has first fastening elements 25, and in FIG. 14, the first fastening elements 25 are located on the front end portions of the first shaft 21 in the first direction (in the direction of +y-axis) and in the opposite direction (in the direction of −y-axis) to the first direction. The second shaft 22 has second fastening elements 26. The second fastening elements 26 are located on the second shaft 22 to correspond to the first fastening elements 25 when the first shaft 21 and the second shaft 22 are coupled to each other.

As shown in FIG. 14, the first fastening elements 25 have concave grooves, and at least portions of the second fastening elements 26 are inserted into the concave grooves of the first fastening elements 25 when the first shaft 21 and the second shaft 22 are coupled to each other. Like this, the second fastening elements 26 having protruding shapes are inserted into the concave grooves of the first fastening elements 25, and accordingly, the first shaft 21 and the second shaft 22 are coupled to each other. In this case, of course, the defecation pad 60 is disposed between the first shaft 21 and the second shaft 22. After that, the used defecation pad 60 is wound onto the rod 20.

If it is desired to remove the wound defecation pad 60 from the rod 20, as mentioned with reference to FIG. 11, one of the first shaft 21 and the second shaft 22 slides relative to the other in the first direction (in the direction of +y-axis) or in the opposite direction to the first direction through the first protrusion PR1 of the first shaft 21 and the second protrusion PR2 of the second shaft 22. To do this, as shown in FIG. 14, the concave grooves of the first fastening elements 25 are open in the opposite direction (in the direction of −y-axis) to the first direction (the direction of +y-axis). When the first shaft 21 and the second shaft 22 slides relative to each other, accordingly, the second fastening elements 26 having the protruding shapes escape from the concave grooves of the first fastening elements 25.

When the first shaft 21 and the second shaft 22 of the rod 20 for the defecation pad 60 as shown in FIG. 14 are coupled to each other, the gear ST having the first teeth ST1 and the second teeth ST2 is provided and thus mounted within the winding frame 10 as shown in FIG. 1.

FIG. 15 is an exploded perspective view showing still yet another example of the rod 20 for the defecation pad 60 according to the present invention. The rod 20 for the defecation pad 60 as shown in FIG. 15 is different from that as shown in FIG. 14 in that the shapes of first fastening elements 27 and second fastening elements 28 are different from those as shown in FIG. 14.

As shown in FIG. 15, the first fastening elements 27 have concave grooves, and at least portions of the second fastening elements 28 are inserted into the concave grooves of the first fastening elements 27 when the first shaft 21 and the second shaft 22 are coupled to each other. In this case, each first fastening element 27 has bent portions toward the center of the concave groove from the end toward the second shaft 22, and each second fastening element 28 has first portions distant from the second shaft 22 larger in width than a second portion adjacent to the second shaft 22, so that when the first shaft 21 and the second shaft 22 are coupled to each other, the first portions of the second fastening elements 28 inserted into the first fastening elements 27 are surrounded with the first fastening elements 27. As a result, the coupled state between the first shaft 21 and the second shaft 22 is stably kept.

The first fastening elements 27 are flexible so that both ends thereof are open, when they are coupled to the second fastening elements 28, to insert portions of the second fastening elements 28 into the concave grooves of the first fastening elements 27. If the portions of the second fastening elements 28 are inserted into the concave grooves of the first fastening elements 27, the first fastening elements 27 are returned to their original shape to prevent the second fastening elements 28 from escaping therefrom. Further, the first portions of each second fastening element 28 are reduced in their sectional area in a direction distant from the second portion, and in a process where the first portions are inserted into the concave groove of the corresponding first fastening element 27, accordingly, both ends of the first fastening element 27 is naturally and gently open.

If it is desired to remove the wound defecation pad 60 from the rod 20, as mentioned with reference to FIG. 11, one of the first shaft 21 and the second shaft 22 slides relative to the other in the first direction (in the direction of +y-axis) or in the opposite direction to the first direction through the first protrusion PR1 of the first shaft 21 and the second protrusion PR2 of the second shaft 22. To do this, as shown in FIG. 15, the concave grooves of the first fastening elements 27 are open in the opposite direction (in the direction of −y-axis) to the first direction (the direction of +y-axis). When the first shaft 21 and the second shaft 22 slides relative to each other, accordingly, the second fastening elements 28 having the protruding shapes escape from the concave grooves of the first fastening elements 27.

When the first shaft 21 and the second shaft 22 of the rod 20 for the defecation pad 60 as shown in FIG. 15 are coupled to each other, the gear ST having the first teeth ST1 and the second teeth ST2 is provided and thus mounted within the winding frame 10 as shown in FIG. 1.

FIG. 16 is a perspective view showing yet another example of the rod 20 for the defecation pad 60 according to the present invention.

As shown, the first shaft 21 and the second shaft 22 extending in the same direction and spaced apart from each other are connected to each other on one end thereof (in the direction of +y-axis). Further, a side fastening part SD' is detachably coupled to the other end (in the direction of −y-axis) of the first shaft 21 and the second shaft 22. After the defecation pad 60 is inserted into the space between the first shaft 21 and the second shaft 22, the rod 20 for the defecation pad 60 is mounted within the winding frame 10 as shown in FIG. 1. If it is desired to remove the wound defecation pad 60 from the rod 20, the side fastening part SD' is separated from the first shaft 21 and the second shaft 22, and the first shaft 21 and the second shaft 22 move toward one end direction (in the direction of +y-axis) from the other end direction with respect to the wound defecation pad 60, so that the first shaft 21 and the second shaft 22 are separated from the wound defecation pad 60.

As mentioned above, the rod 20 for the defecation pad 60 as shown in FIG. 16 has teeth so that it is mounted in the winding frame 10 as shown in FIG. 1. In this case, the gear ST is formed on the outer peripheries of one end of the first shaft 21 and one end of the second shaft 22 connected to each other. Otherwise, the gear ST may be formed on the outer periphery of the side fastening part SD'.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A rod for a defecation pad, comprising:
   a first shaft extending in a first direction and having a cross section with the outer periphery of a semicircle or a portion of a semicircle perpendicular to the first direction;
   a second shaft extending in the first direction and having a cross section with the outer periphery of a semicircle or a portion of a semicircle perpendicular to the first direction;
   first fastening elements mounted on one of the first shaft and the second shaft; and
   second fastening elements mounted on the other of the first shaft and the second shaft to correspond to the first fastening elements when the first shaft and the second shaft are coupled to each other,
   wherein the first fastening elements have magnets and the second fastening elements have ferromagnets or magnets.

2. The rod for a defecation pad according to claim 1, wherein the first fastening elements come into contact with the second fastening elements when the first shaft and the second shaft are coupled to each other.

3. The rod for a defecation pad according to claim 1, wherein at least portions of ones of the first fastening elements and the second fastening elements are inserted into the other ones of the first fastening elements and the second fastening elements when the first shaft and the second shaft are coupled to each other.

4. The rod for a defecation pad according to claim 1, wherein when the first shaft and the second shaft are coupled to each other, the outer periphery of the semicircle or the portion of semicircle of the cross section of the first shaft perpendicular to the first direction is convex in a direction distant from the second shaft, and the outer periphery of the semicircle or the portion of semicircle of the cross section of the second shaft perpendicular to the first direction is convex in a direction distant from the first shaft.

5. The rod for a defecation pad according to claim 1, wherein the first shaft has first teeth formed on the outer periphery of a front end portion thereof in the first direction, and the second shaft has second teeth formed on the outer periphery of a front end portion thereof in the first direction, so that when the first shaft and the second shaft are coupled to each other, a gear with the first teeth and the second teeth is formed on the outer periphery thereof.

6. The rod for a defecation pad according to claim 5, wherein the first shaft has a first protrusion protruding from a opposite direction front end portion to the first direction in the direction distant from a center axis thereof, and the second shaft has a second protrusion protruding from the opposite direction front end portion to the first direction in the direction distant from the center axis thereof, so that when the first shaft and the second shaft are coupled to each other, a locking portion having the first protrusion and the second protrusion is formed on a second front end portion thereof in the opposite direction to the first direction.

7. The rod for a defecation pad according to claim 1, wherein when the first shaft and the second shaft are coupled to each other, a first front end portion in the first direction of the first shaft comes into contact with the first front end portion in the first direction of the second shaft, and a second front end portion in the opposite direction to the first direction of the first shaft comes into contact with the second front end portion in the opposite direction to the first direction of the second shaft, so that a first central portion between the first front end portion and the second front end portion of the first shaft is spaced apart from a second central portion between the first front end portion and the second front end portion of the second shaft.

8. The rod for a defecation pad according to claim 7, wherein lengths of the first central portion of the first shaft and the second central portion of the second shaft in the first direction are greater than a width of the defecation pad wound thereonto.

9. A rod for a defecation pad, comprising:
a first shaft extending in a first direction;
a second shaft extending in the first direction and spaced apart from the first shaft in such a way that one end thereof is connected to one end of the first shaft; and
a side fastening part detachably coupled to the other end of the first shaft and the other end of the second shaft, wherein the side fastening part has teeth formed on the outer periphery thereof.

10. The rod for a defecation pad according to claim 9, wherein the first shaft and the second shaft have teeth formed on one end outer peripheries connected to each other.

11. A rod for a defecation pad, comprising:
a first shaft extending in a first direction and having an accommodation portion with an empty internal space formed on a front end portion in the first direction, while having a cross section with the outer periphery of a semicircle or a portion of a semicircle perpendicular to the first direction on the entire portion except the accommodation portion; and
a second shaft extending in the first direction and having an insertion portion formed on the front end portion in the first direction and thus inserted into the accommodation portion, while having a cross section with the outer periphery of a semicircle or a portion of a semicircle perpendicular to the first direction on the entire portion except the insertion portion,
wherein the accommodation portion has teeth formed on the outer periphery thereof.

12. The rod for a defecation pad according to claim 11, wherein the first shaft has first teeth formed on the outer periphery of the front end portion thereof in the opposite direction to the first direction, and the second shaft has second teeth formed on the outer periphery of a front end portion thereof in the opposite direction to the first direction, so that when the first shaft and the second shaft are coupled to each other, a gear with the first teeth and the second teeth is formed on the outer periphery of the front end portion thereof in the opposite direction to the first direction.

\* \* \* \* \*